United States Patent

Fujii et al.

Patent Number: 6,140,825
Date of Patent: Oct. 31, 2000

[54] METHOD AND APPARATUS FOR EVALUATING QUALITY OF RESISTANCE WELDS

[75] Inventors: Koji Fujii, Osaka; Yasuhiro Goto, Kawanishi; Makoto Ryudo, Minoo; Kin-ichi Matsuyama, Suita, all of Japan

[73] Assignee: Matsushita Electric Industrial Co., Ltd., Osaka-fu, Japan

[21] Appl. No.: 09/075,953

[22] Filed: May 12, 1998

[30] Foreign Application Priority Data

May 14, 1997 [JP] Japan ................................ 9-123689

[51] Int. Cl.[7] .................................................. B23K 11/24
[52] U.S. Cl. .......................... 324/718; 324/703; 219/110
[58] Field of Search ................................ 219/86.41, 110; 324/703, 718, 713

[56] References Cited

U.S. PATENT DOCUMENTS

| | | |
|---|---|---|
| 4,302,653 | 11/1981 | Denning et al. . |
| 4,503,311 | 3/1985 | Houchens ................................. 215/110 |
| 4,963,707 | 10/1990 | Zyokou .................................... 215/110 |
| 5,440,092 | 8/1995 | Kawai . |

FOREIGN PATENT DOCUMENTS

| | | |
|---|---|---|
| 0129963 | 1/1985 | European Pat. Off. . |
| 0142582 | 5/1985 | European Pat. Off. . |
| 52-94841 | 8/1977 | Japan . |
| 6040955 | 5/1979 | Japan . |
| 5940550 | 9/1981 | Japan . |
| 56-158286 | 12/1981 | Japan . |
| 59-14312 | 4/1984 | Japan . |
| 59-61580 | 4/1984 | Japan . |
| 1216246 | 8/1989 | Japan . |
| 2073446 | 10/1981 | United Kingdom . |

OTHER PUBLICATIONS

"A Study on a Numerical Analysis Method for Welding Current Path and Temperature Distribution in Spot Welding", N. Sano, Master's Thesis, Osaka University, 1979. (no translation).

"A Study on Faster Quality Monitoring With the Aid of Numerical Calculation For Resistance Spot Welding", Y. Nishiu, Master's Thesis, Osaka University, 1991. (no translation).

A Japanese Language abstract of JP 59–14312 (publication No. 56039181A), Apr. 1981.

A Japanese Language abstract of JP 59–40550 (publication No. 56109178A), Aug. 1981.

A Japanese Language abstract of JP 59–61580 (publication No. 59061580A), Apr. 1984.

A Japanese Language abstract of JP 60–40955 (publication No. 54057440A), May 1979.

A Japanese Language abstract of JP 1–216246 (publication No. 01216246A). Aug. 1989.

*Primary Examiner*—Safet Metjahic
*Assistant Examiner*—Jose M. Solis
*Attorney, Agent, or Firm*—Greenblum & Bernstein, P.L.C.

[57] ABSTRACT

A method for evaluating quality of a resistance weld is provided, in which a nugget generation state during a welding process is evaluated by observable numerical values based on physical phenomena, and which can afford a wide application range in welding material as well as a capability of accurate knowledge as to the nugget generation state of the weld. Based on that a specific resistance value of a metal material to be welded has a temperature dependency in a conduction state of AC or current-pulsated welding current, a rate of change of inter-chip dynamic resistance instantaneous value during a current changing period is determined, a changing state of the dynamic resistance instantaneous value is further calculated, and a heat-generating state of a weld zone, i.e., a nugget formation state is estimated. Thus, a quality evaluation of a weld is performed accurately.

5 Claims, 2 Drawing Sheets

METHOD AND APPARATUS FOR EVALUATING QUALITY OF RESISTANCE WELDS

BACKGROUND OF THE INVENTION

The present invention relates to method and apparatus for evaluating the quality of resistance welds, in particular, in spot welding.

Whereas resistance welding, particularly, spot welding has been applied for various products using steel plates, there is a tendency toward increasing welding defects in recent years. That is, because mild steel plates have commonly been materials to be welded hitherto, inferior welding current would scarcely occur so that the welding quality could be maintained relatively stable by controlling the welding conditions constant. However, as large quantities of galvanized steel plates and high tension steel plates have begun to be used in place of mild steel plates, the occurrence of weld defects have been increasing. From such a background, there has been a desired earnestly a method and an apparatus operative for not merely monitoring the welding conditions but also allowing the welding quality to be monitored with high precision.

With regard to this problem, there have been developed a variety of welding quality monitoring systems with the aim of judging, after the completion of a welding process, whether the welding result is good or poor. A judgment as to whether a welding result is good or poor, if possible, allows the result to be reflected on the next-time welding. Such welding quality monitoring systems that have been developed so far are exemplified by:

(1) a system in which an inter-chip resistance is determined from welding current and welding voltage and, based on a change pattern of the inter-chip resistance, the goodness or poorness of a welding result is judged, an example being disclosed in Japanese Patent Laid-Open Publication SHO 56-158286;

(2) a system in which an inter-chip voltage is compared with time change of a preset reference voltage and, depending on whether or not the difference between them is within an allowable value, the goodness or poorness is judged, an example being disclosed in Japanese Patent Publication for opposition SHO 59-14312; and those in which an effective component that effectively contributes to heat generation of a weld is extracted from an inter-chip voltage and, based on a time integration value of the effective component, the goodness or poorness of a welding result is judged, an example being disclosed in Japanese Patent Publication for opposition SHO 59-40550 and Japanese Patent Laid-Open Publication SHO 59-61580;

(3) a system in which exothermic temperature is detected and, based on its temperature changing pattern, the goodness or poorness of a welding result is judged, an example being disclosed in Japanese Patent Laid-Open Publication HEI 1-216246;

(4) a system in which ultrasonic waves are transmitted between materials to be welded and, based on the resulting amount of transmission, the goodness or poorness of a welding result is judged, an example being disclosed in Japanese Patent Laid-Open Publication SHO 52-94841;

(5) a system in which a signal derived from an acceleration sensor mounted on an electrode chip is double integrated and the resulting displacement of the electrode chip during a welding process is used, an example being disclosed in Japanese Patent Publication for opposition SHO 60-40955;

(6) a system in which welding current is detected and its upper and lower limit values are monitored with an aim of maintaining welding results constant;

(7) a system in which with a thermal conduction model used, a nugget diameter is calculated by using a computer, an example being disclosed in Sano, "A study on numerical analysis method for welding current path and temperature distribution in spot welding", Master's thesis specialized in welding in Osaka University Postgraduate Course (1979), and Nishiu, "A study on faster quality monitoring with the aid of numerical calculation for resistance spot welding" Master's thesis specialized in welding in Osaka University Postgraduate Course (1991); and the like.

Among these systems, with System (1), when crush or welding current diversion of a chip end portion has occurred or when the material to be welded is galvanized steel plate, it becomes hard to judge the goodness or poorness of a welding result because of non-uniform changing pattern of resistance. With System (2), because of the need of re-setting the judgment conditions for a welding result each time the welding state has undergone a change such as crush of the chip or a change in the plate thickness, it is hard to make an accurate judgment of the goodness or poorness on a practical base. Systems (3) and (4) have difficulties in field-work applicability in terms of the way how to install and mount temperature detecting equipment and ultrasonic transmitting and receiving equipment. System (5) is problematic for practical use because of noise mixing, difficulty in measurement of small displacements, differences in mechanical strength among individual resistance welders and the like which would be involved in applications to welding field work. System (6) is low price in terms of cost, easy to implement and effective for finding power failures, breaking of secondary conductors and the like, but is unable to discriminate quality deteriorations of welds due to lowering of current density such as crush and welding current diversion of the chip end portion.

Further, these various types of conventional welding quality monitoring systems would involve the work of making a preliminary experiment at welding fields for each welding material and then previously determining the relationship between welding quality and discrimination criteria, and besides the discrimination result could only afford a rough judgment as to the goodness or poorness of a weld. System (7), although having a potential capability of resolving the foregoing problems, would take long time to resolve the equation of heat conduction as its greatest defect. Due to this, it would be the case that a welding result cannot be judged until the welding process is completed, so that output control of the welder itself or improvement in welding results could not be achieved.

The object of the present invention is therefore to solve the above problems and to provide method and apparatus for monitoring a quality of resistance welds, capable of monitoring a state of generation of a nugget with general versatility, and of evaluating the quality of welds with reliability.

In order to achieve the above object, there is provided, a method for evaluating quality of a resistance weld, comprising steps of:

detecting instantaneous values of welding current and inter-chip voltage during a current changing period during which instantaneous value of the welding current is changing;

calculating an instantaneous value of an apparent inter-chip dynamic resistance from both detected values;

calculating a rate of change of dynamic resistance instantaneous value of the inter-chip dynamic resistance at an arbitrary time during the current changing period; and evaluating welding quality by using a change characteristic of the rate of change of dynamic resistance instantaneous value calculated in correspondence to a number of times of occurrence of the current changing period.

In order to achieve the above object, there is also provided an apparatus for evaluating quality of a resistance weld, comprising:

welding current measuring means for detecting welding current;

inter-chip voltage detecting means for detecting inter-chip voltage;

inter-chip dynamic resistance calculating means for calculating an apparent inter-chip dynamic resistance from detected values of the measuring means and the detecting means;

rate of change of dynamic resistance instantaneous value calculating means for calculating a rate of change of dynamic resistance instantaneous value of the inter-chip dynamic resistance during a current changing period during which the instantaneous value of the welding current in a welding process is changing;

storage means for storing the inter-chip dynamic resistance and the rate of change of dynamic resistance instantaneous value one after another; and arithmetic means for performing arithmetic process for judgment of welding quality by using the stored rates of change of dynamic resistance instantaneous value.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
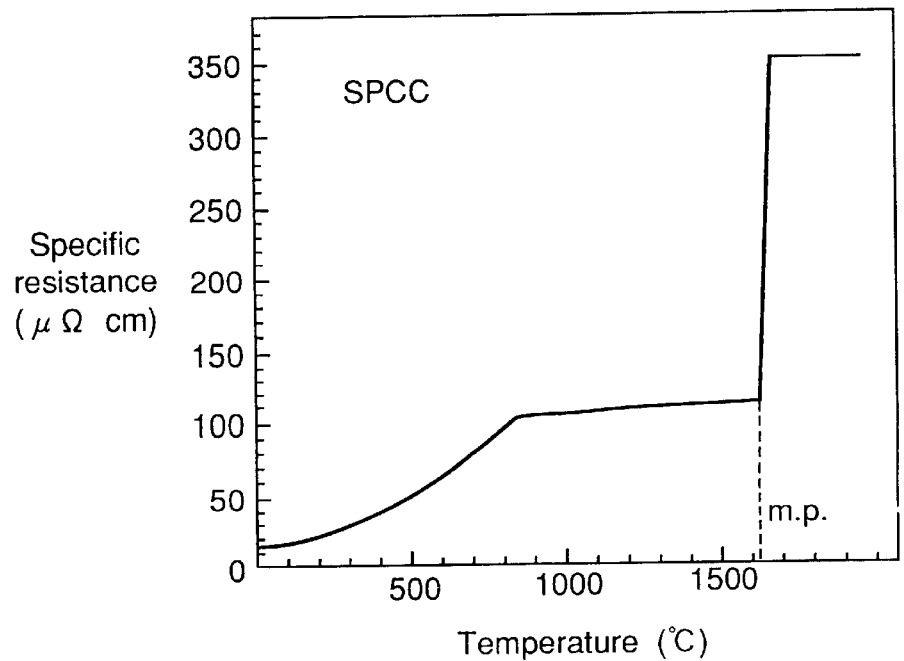
FIG. 2 is an explanatory view of temperature dependency of specific resistance of a metal material.

A quality evaluating method for resistance welds according to the present invention is explained. Instantaneous values of welding current and inter-chip voltage are detected during a current changing period Tn during which the instantaneous value of welding current in a welding process is changing, for example, during a half cycle period in alternating welding current or during a current period with current pulsation. An apparent inter-chip resistance is obtained from the instantaneous values of welding current and inter-chip voltage, where the resulting inter-chip resistance value is called an inter-chip dynamic resistance instantaneous value. The behavior of this inter-chip dynamic resistance instantaneous value can be considered to be responsive to the positive temperature dependency of specific resistance possessed by a metal material provided for welding, and further the rate of change of the inter-chip dynamic resistance instantaneous value during a current changing period, i.e., a rate of change $\Delta Rn$ of dynamic resistance instantaneous value can be considered to be associated also with temperature increasing rate of a weld zone. FIG. 2 shows an example of the temperature dependency of specific resistance of a metal material. Therefore, a changing process of specific resistance and temperature increasing state can be grasped by calculating the inter-chip dynamic resistance for a current changing period T1 to a current changing period Tn and further calculating the rate of change $\Delta Rn$ of dynamic resistance instantaneous value one after another for the individual periods. Thus, the weld formation state of a weld zone, i.e., the quality evaluation of a weld can be accomplished.

In addition, because a directly measured inter-chip voltage waveform would include noise such as an induced voltage due to the mutual inductance between welding circuit and measuring circuit, there is a need of resolving this noise.

Hereinbelow, an embodiment of the present invention is described with reference to the accompanying drawings.

Figure 1:
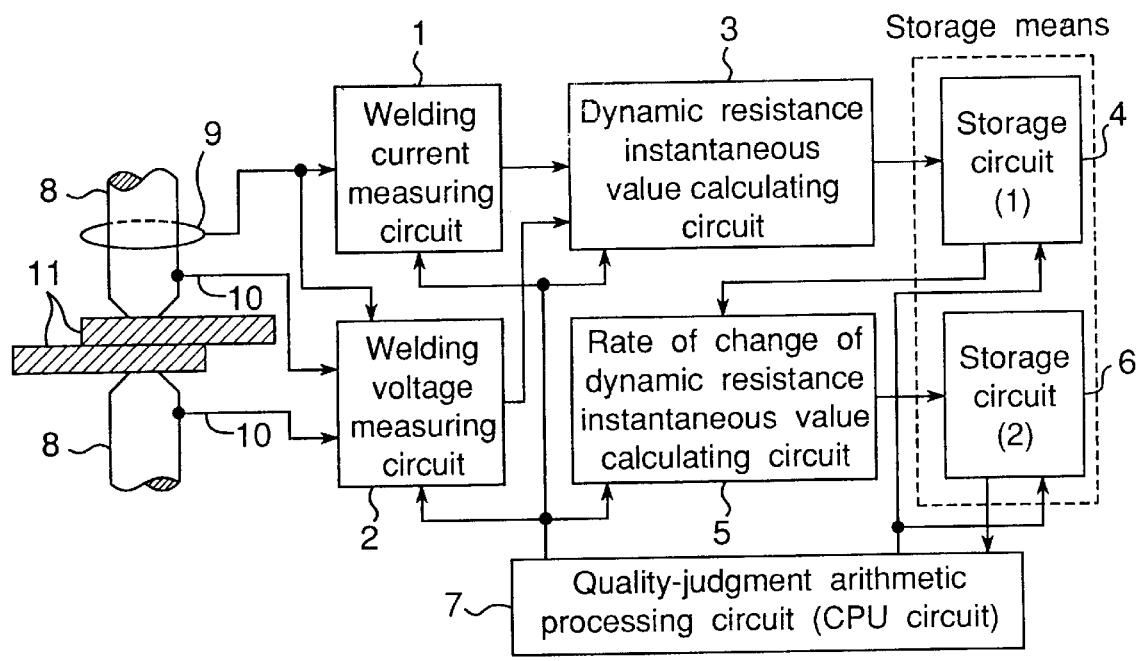
FIG. 1 is an explanatory view showing the configuration of a quality evaluating apparatus for resistance welds according to an embodiment of the present invention.
Figure 3:
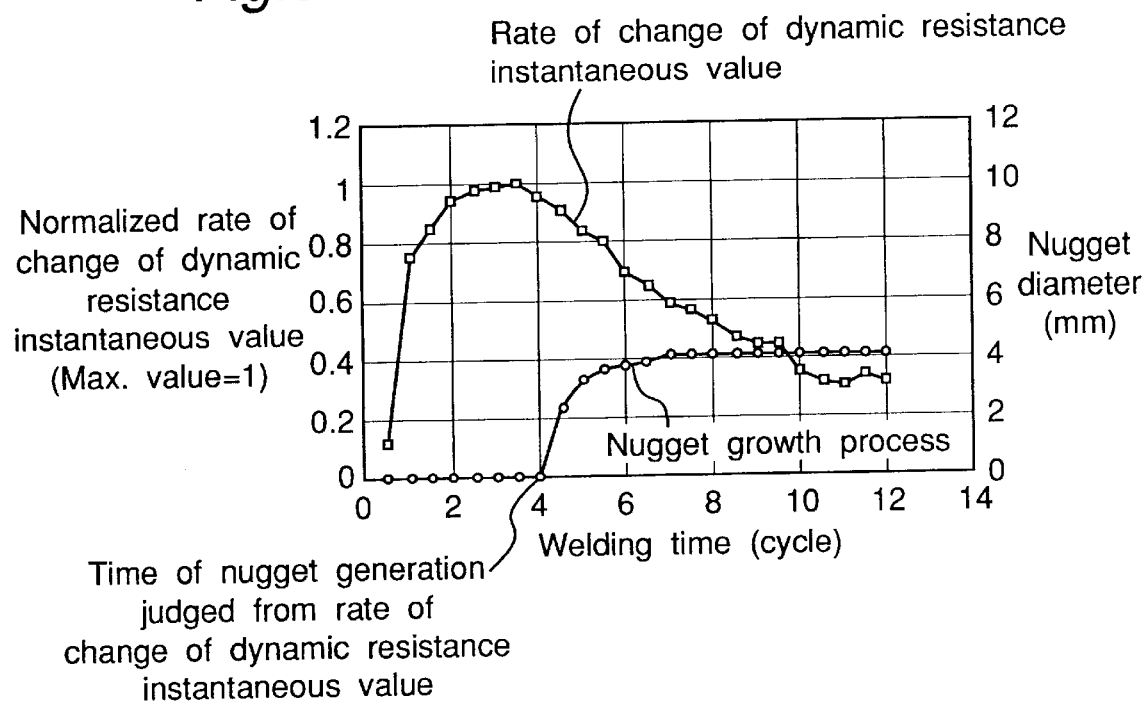
FIG. 3 is an explanatory view for measured values of the rate of change of dynamic resistance instantaneous value as well as for a nugget generation state at a weld.

Referring to FIG. 1, a welding electrode (chip) 8 is connected to an unshown AC welding source, and put into electrical conduction via a material 11 to be welded. Because the conduction current is an alternating current, the observation of current changing periods is done on a basis of each AC half cycle in the conduction state, so that rates of change in the dynamic resistance instantaneous value can be obtained throughout all the periods in the conduction state. A toroidal coil 9 detects magnetic flux generated in the welding current conduction state, a welding current measuring circuit 1 performs amplification and integration process, and an A/D conversion process is performed at a command timing by a quality-judgment arithmetic processing circuit 7, and the welding current is measured. Also, an apparent inter-chip voltage is measured by a welding voltage detection line 10, where this apparent inter-chip voltage includes induced voltages due to magnetic field generated by the welding current and due to mutual and self inductances of the welding voltage detection line 10. As means for removing any effects of these induced voltages, with a signal of the toroidal coil 9 used, the induced voltage included in the apparent inter-chip voltage is removed in a welding voltage measuring circuit 2, followed by an A/D conversion process, by which the inter-chip voltage is measured. The measured welding current and inter-chip voltage are calculated by a dynamic resistance instantaneous value calculating circuit 3, by which an instantaneous inter-chip resistance value, i.e. inter-chip dynamic resistance instantaneous value is calculated. This value is stored one after another in a first storage circuit 4 during a current changing period, i.e., a half cycle, and further a rate of change of the dynamic resistance instantaneous value at an arbitrary time point during the half cycle is calculated by a rate of change of dynamic resistance instantaneous value calculating circuit 5. Although a rate of change of dynamic resistance instantaneous value at a time point when the welding current becomes a maximum value is calculated as the rate of change of dynamic resistance instantaneous value in this embodiment, the time point at which the rate of change of dynamic resistance instantaneous value is calculated has only to be around a time point when temperature change at the weld becomes a maximum. The calculated rate of change of dynamic resistance instantaneous value is stored in a second storage circuit 6. Further, when the succeeding current changing period (succeeding half cycle) has been started, the rate of change of dynamic resistance instantaneous value is calculated by the same flow of processing as in the foregoing, and stored in the second storage circuit 6. Like this, the second storage circuit 6 has rates of change of dynamic resistance instantaneous value stored with progress of the welding, so that the temperature increase process at the weld can be estimated by a quality-judgment arithmetic processing circuit 7 from the changes in the value of the rate of change of dynamic resistance instantaneous value. FIG. 3 shows an example of the value change in the rate of change of dynamic resistance instantaneous value with progress of the welding, a judgment timing for the time of molten zone generation by the quality-judgment arithmetic processing circuit 7, and the time of nugget generation measured with the weld actually cut, in this embodiment. For the judgment arithmetic in this case, the time point at which the value of the rate of change of dynamic resistance instantaneous value becomes a maximum value is taken as the time of molten zone (nugget) generation, where it can be understood also from FIG. 3 that a high precision judgment can be achieved. In addition, although the time of nugget generation has been judged in this embodiment, it is also possible that the size of a nugget is determined by using the absolute value of the rate of change of dynamic resistance instantaneous value and its elapsing time, because the rate of change of dynamic resistance instantaneous value is based on the temperature dependency of specific resistance value of the metal material to be welded as illustrated in FIG. 2 and moreover, apparently, also related directly to the state of change in the volume of the molten zone. Further, when the specific resistance value is less dependent on temperature before the metal material to be welded begins to melt, as in the case of aluminum or the like, it is also possible to judge the time of nugget generation by using the time at which the absolute value of the rate of change of resistance value abruptly changes, taking advantage of the change in the specific resistance value that abruptly changes with melting. Furthermore, when an "expulsion" occurs during the welding process, the volume of the molten zone largely decreases and, in turn, the rate of change of dynamic resistance instantaneous value also largely changes so that it may be used as means for detecting an "expulsion".

As shown above, according to the method and apparatus for evaluating the quality of resistance welds in the present invention, the nugget generation state during a welding process can be evaluated by observable numerical values based on physical phenomena. Thus, there can be produced superior performance effects such as a wide application range in welding material, a capability of accurate knowledge as to the nugget generation state of welds, a capability of estimating the size of a generated nugget as well, and a capability of reliably monitoring the time at which an "expulsion" occurs.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for evaluating quality of a resistance weld, comprising:

continuously detecting instantaneous values of welding current and inter-electrode voltage during a current changing period during which instantaneous value of the welding current is changing;

continuously calculating an instantaneous value of an apparent inter-electrode dynamic resistance from both detected values;

obtaining a series of the calculated instantaneous values, and calculating a differential coefficient, representative of an approximate waveform formed from the obtained series of calculated instantaneous values, as a rate of change of the dynamic resistance instantaneous value during an arbitrary time period; and evaluating welding quality by using a change characteristic of the calculated rate of change of dynamic resistance instantaneous value.

2. An apparatus for evaluating quality of a resistance weld, comprising:

a welding current measuring circuit that continuously detects an instantaneous value of welding current;

an inter-chip voltage detecting circuit that continuously detects an instantaneous value of inter-electrode voltage;

an inter-chip dynamic resistance instantaneous value calculating circuit that continuously calculates an instantaneous value of an apparent inter-electrode dynamic resistance from detected values of the measuring circuit and the detecting circuit;

a rate of change of dynamic resistance instantaneous value calculating circuit that calculates a rate of change of dynamic resistance instantaneous value of the inter-electrode dynamic resistance instantaneous value during a current changing period during which the instantaneous value of the welding current in a welding process is changing;

a storage circuit that stores the inter-electrode dynamic resistance instantaneous value and the rate of change of dynamic resistance instantaneous value one after another; and an arithmetic processing circuit that performs an arithmetic process for judgement of welding quality by using the stored rates of change of dynamic resistance instantaneous value.

3. A method for evaluating quality of a resistance weld as claimed in claim 1, wherein the rate of change of dynamic resistance instantaneous value is calculated at a time point when the welding current becomes a maximum value.

4. An apparatus for evaluating quality of a resistance weld as claimed in claim 2, wherein the rate of change of dynamic resistance instantaneous value calculating circuit calculates the rate of change of dynamic resistance instantaneous value at a time point when the welding current becomes a maximum value.

5. An apparatus for evaluating quality of a resistance weld as claimed in claim 2, wherein the storage circuit stores rates of change of dynamic resistance instantaneous values, so that the arithmetic processing circuit can estimate temperature increase at the resistance weld.

* * * * *